United States Patent
LeGall et al.

(10) Patent No.: US 7,880,776 B2
(45) Date of Patent: Feb. 1, 2011

(54) HIGH RESOLUTION ZOOM: A NOVEL DIGITAL ZOOM FOR DIGITAL VIDEO CAMERA

(75) Inventors: Didier LeGall, Los Altos, CA (US);
Leslie D. Kohn, Fremont, CA (US);
Elliot N. Linzer, Suffern, NY (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 12/716,525

(22) Filed: Mar. 3, 2010

(65) Prior Publication Data

US 2010/0157103 A1 Jun. 24, 2010

Related U.S. Application Data

(63) Continuation of application No. 11/010,032, filed on Dec. 10, 2004, now Pat. No. 7,688,364.

(51) Int. Cl.
*H04N 5/262* (2006.01)
*H04N 5/228* (2006.01)

(52) U.S. Cl. .................. 348/240.99; 348/208.6; 348/240.1

(58) Field of Classification Search .......... 348/208.6, 348/240.99, 240.1
See application file for complete search history.

(56) References Cited

U.S. PATENT DOCUMENTS

| | | | | |
|---|---|---|---|---|
| 5,420,632 | A * | 5/1995 | Yamagiwa | 348/240.3 |
| 5,882,625 | A | 3/1999 | MacDougall et al. | 423/700 |
| 6,654,506 | B1 * | 11/2003 | Luo et al. | 382/282 |
| 6,654,507 | B2 * | 11/2003 | Luo | 382/282 |
| 6,876,386 | B1 * | 4/2005 | Ito | 348/240.1 |
| 6,982,755 | B1 * | 1/2006 | Kikuzawa | 348/241 |
| 7,221,386 | B2 | 5/2007 | Thacher et al. | 348/14.02 |
| 7,227,573 | B2 | 6/2007 | Stavely | 348/240.2 |
| 7,417,670 | B1 | 8/2008 | Linzer et al. | 348/222.1 |
| 7,477,297 | B2 * | 1/2009 | Pollard | 348/240.1 |

(Continued)

FOREIGN PATENT DOCUMENTS

JP 06-203148 7/1994

(Continued)

OTHER PUBLICATIONS

Micron Technology, Inc., Boise, ID, "½-Inch 3-Megapixel CMOS Active-Pixel Digital Image Sensor" data sheet, Rev C, Sep. 2004. (MT9T001_3100_DS_1.fm-Rev.C9/04EN 2003 Micron Technology, Inc. All rights reserved.).

*Primary Examiner*—Sinh Tran
*Assistant Examiner*—Hung H Lam
(74) *Attorney, Agent, or Firm*—Christopher P. Maiorana, PC

(57) ABSTRACT

A camera system and a method for zooming the camera system is disclosed. The method generally includes the steps of (A) generating an electronic image by sensing an optical image received by the camera, the sensing including electronic cropping to a window size to establish an initial resolution for the electronic image, (B) generating a final image by decimating the electronic image by a decimation factor to a final resolution smaller than the initial resolution and (C) changing a zoom factor for the final image by adjusting both of the decimation factor and the window size.

18 Claims, 8 Drawing Sheets

U.S. PATENT DOCUMENTS

| | | | |
|---|---|---|---|
| 2004/0189830 A1 | 9/2004 | Pollard | 348/240.1 |
| 2005/0046710 A1* | 3/2005 | Miyazaki | 348/239 |
| 2005/0052646 A1 | 3/2005 | Wohlstadter et al. | 356/311 |
| 2005/0078205 A1 | 4/2005 | Hynecek | 348/294 |
| 2005/0083556 A1 | 4/2005 | Carlson | 358/474 |
| 2005/0093982 A1 | 5/2005 | Kuroki | 348/207.99 |
| 2006/0077269 A1 | 4/2006 | Kindt et al. | 348/294 |
| 2009/0028413 A1 | 1/2009 | Goodwin et al. | 382/133 |

FOREIGN PATENT DOCUMENTS

| | | |
|---|---|---|
| JP | 2000-184259 | 6/2000 |

* cited by examiner

HIGH RESOLUTION ZOOM: A NOVEL DIGITAL ZOOM FOR DIGITAL VIDEO CAMERA

This is a continuation of U.S. Ser. No. 11/010,032, filed Dec. 10, 2004, now U.S. Pat. No. 7,688,364 which is incorporated by reference.

FIELD OF THE INVENTION

The present invention relates to video image processing generally and, more particularly, to a digital zoom for digital video cameras.

BACKGROUND OF THE INVENTION

Functionality of conventional Digital Still Cameras (DSC) and conventional camcorders are converging. The DSCs implement sensors (i.e., CCD or CMOS) with at least 4 to 5 million pixels. A video signal in a typical camcorder is acquired at 30 to 60 frames per seconds with a resolution varying from 720×480 (i.e., standard definition) to 1920×1080 (i.e., high definition) viewable pixels. The availability of sensors that can combine both a high pixel number to accommodate DSCs and a transfer rate to accommodate video allows an introduction of a new digital zoom function that is quite different from the current digital zoom function used in conventional cameras and camcorders.

A conventional digital zoom operation, also called "interpolated" zoom, is achieved by calculating an up-conversion of a window in existing image data to generate an enlarged version. Interpolated zoom is achieved by cropping a window in a standard resolution picture and enlarging the window by interpolation. The resulting image has a progressively decreasing resolution as the cropping factor increases. The decreasing spatial resolution has created a feeling among users that digital zoom is a technique inferior to a true optical zoom.

SUMMARY OF THE INVENTION

The present invention concerns a camera system and a method for zooming the camera. The method generally comprises the steps of (A) generating an electronic image by sensing an optical image received by the camera, the sensing including electronic cropping to a window size to establish an initial resolution for the electronic image, (B) generating a final image by decimating the electronic image by a decimation factor to a final resolution smaller than the initial resolution and (C) changing a zoom factor for the final image by adjusting both of the decimation factor and the window size.

The objects, features and advantages of the present invention include providing a zooming method and a camera system that may provide (i) a high resolution digital zoom capability, (ii) a substantially constant output image resolution at different zoom levels, (iii) a low light mode, (iv) a low distortion mode, (v) a digital zoom capable of operating with camcorder speed data and/or (vi) a low-cost alternative to high zoom optics.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
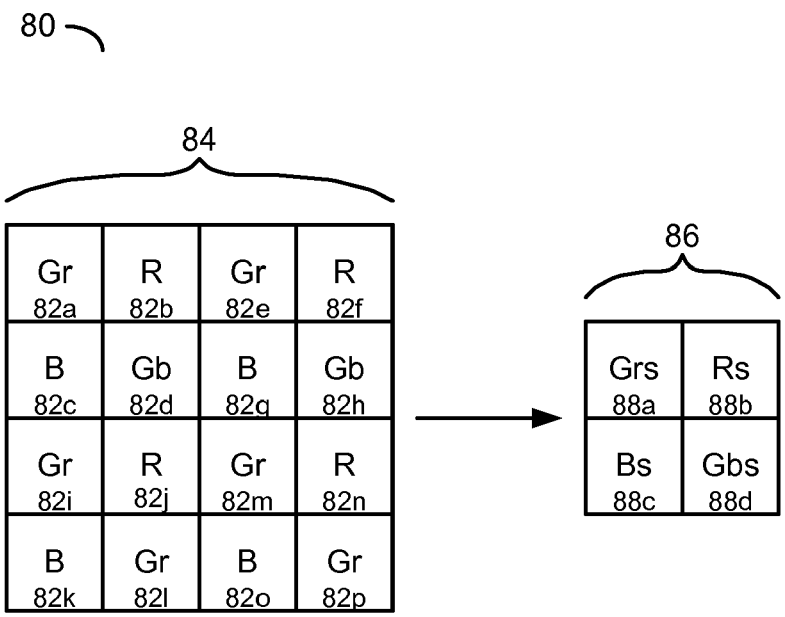
FIG. 1 is a block diagram of a first example binning process.

The present invention described herein may be referred to as a High Resolution (HR) Zoom. HR Zoom generally allows a user to control a zoom factor (or level) by electronically cropping (or windowing) a sensor area detecting an optical image, digitizing a resulting electrical image and down-sampling the electronic image to a final resolution. An amount of cropping and a level of down-sampling may be controlled so that the final resolution is substantially constant over a range of different zoom factors. In HR Zoom, a subjective digital zoom effect may appear much like an optical zoom in that pictures generally remain sharp throughout zoom-in and zoom-out operations.

In video applications where a standard resolution video (e.g., International Telecommunications Union-Radiocommunications Sector, Recommendation BT.656-4 (February 1998), Geneva, Switzerland) may be implemented, the HR Zoom process generally allows a high resolution electronic zoom-in ratio up to a square root of a raw data capture rate divided by a video resolution rate. For example, a sensor element capture rate of 60 megahertz (MHz) may yield about 2 million pixels per frame at 30 frames per second. Decimating the image data down to a 720×480 pixel video resolution at 30 frames per second (e.g., 10.37 MHz) generally allows a 2.4 maximum zoom factor. In practice, the raw data input data rate may be limited by a speed of an optical sensor array. The high image resolution available in modern optical sensor arrays generally permits acquisition of raw image data at a resolution significantly higher than standard video resolution, thus allowing the implementation of the HR Zoom process.

Sensor arrays for Digital Still Cameras (DCS) and camcorders generally have a large number of individual optical-to-electrical sensor elements. Therefore, reading all the sensor elements (e.g., 5 million elements or pixels) in the sensor array may not be possible in a video frame period (e.g., 1/30th to 1/60th of a second). One or more of the following techniques may be used to reduce an output rate from a sensor array. A first technique may be to skip some sensor element rows and/or columns to cover the whole sensor array area, but not present all of the available data. A second technique, called binning, may be implemented to reduce (i) a total amount of data presented and (ii) an impact of aliasing due to sub-sampling. In binning, multiple sensor element sets may be combined to create a binned set. The binning technique generally has multiple advantages over sub-sampling (e.g., skipping) since both aliasing and photon noise inherent to optical detection may be reduced by the combination of the collected samples.

A sensor array (e.g., a CCD array or a CMOS array) may be either a monochrome sensor array or a color sensor array. In the case of a monochrome sensor array, three monochrome sensor arrays may be implemented to generate a color image. In the case of the color sensor array, a mosaic of red, green and blue color filters is generally applied on the sensor surface. The most common mosaic pattern is called a Bayer pattern consisting of two green cells and one each of a red cell and a blue cell. Applications of the HR Zoom process with Bayer patterned sensor arrays generally include a conversion step to red-green-blue (RGB) data before filtered decimation in RGB space. The conversion step is commonly called de-mosaicing.

Referring to FIG. 1, a block diagram of a first example binning process 80 is shown. The first binning process 80 generally illustrates a bin ratio of 2:1 in each of a horizontal and a vertical direction. In particular, individual image elements 82a-82p generated in a set 84 of adjoining sensor elements (e.g., a 4×4 set) may be combined to form a binned set 86 defining fewer image elements 88a-88d. The binned set 86 generally defines R, B and two G values.

The original set 84 generally comprises four Bayer sets of sensor elements. Each Bayer set generally comprises a sensor element defining a red value and a location (e.g., R), a sensor element defining a blue value and a location (e.g., B) and two sensor elements defining two green values and two locations (e.g., Gr and Gb). The green sensor element Gr may be located on a same row as the red sensor element R. The green sensor element Gb may be located on a same row as the blue sensor element B. The binned set 86 may follow the Bayer pattern defining a virtual red sensor element (e.g., Rs), a virtual blue sensor element (e.g., Bs) and two virtual green sensor elements (e.g., Grs and Gbs). Other sensor element layouts and color patterns may be implemented to meet the criteria of a particular application.

An effect of the 2:1 bin ratio in each direction may be to reduce an image data rate from the sensor array by a factor of four while still allowing all of the photons striking the original set 84 to contribute to the binned set 86. Therefore, the maximum zoom factor may increase since the raw data capture rate is generally reduced. For example, the 2:1 bin ratio in each direction and a 5 million pixel sensor array generally yields a 3.80 maximum zoom factor as long as the raw capture rate is greater than 40 MHz.

Figure 2:
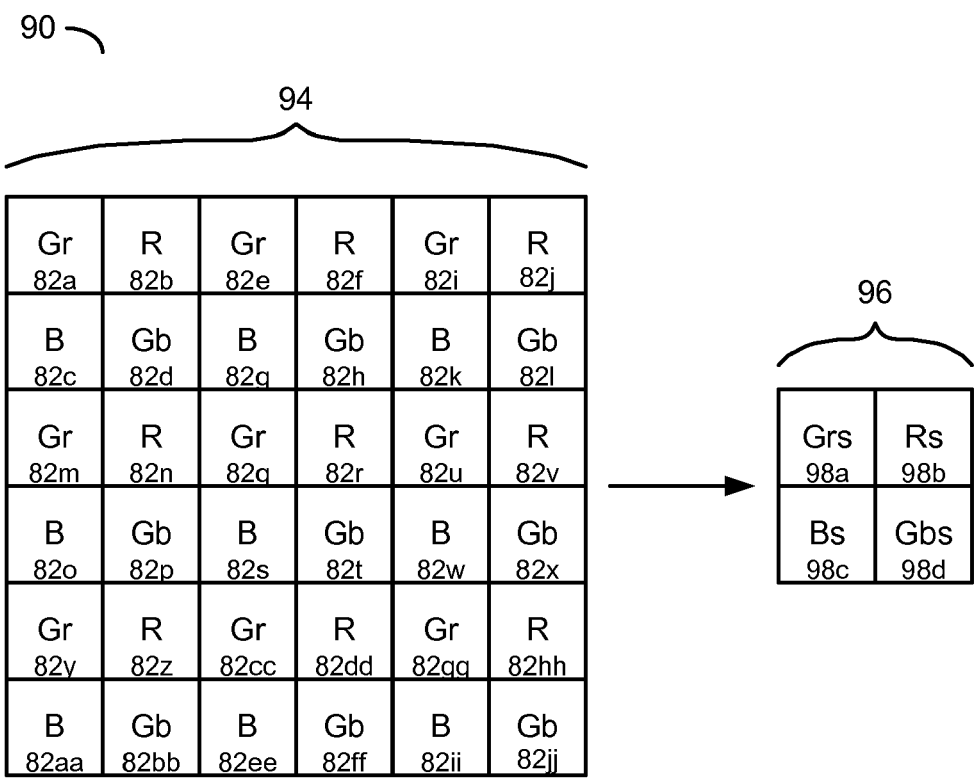
FIG. 2 is a block diagram of a second example binning process.

Referring to FIG. 2, a block diagram of a second example binning process 90 is shown. The second binning process 90 generally illustrates a bin ratio of 3:1 in each direction. In particular, individual image elements 82a-82jj generated within a set 94 may be combined to form a binned set 96. Each binned image element 98a-98d may be generated from the original set 94. An effect of the 3:1 bin ratio in each direction may be to reduce an image data rate from the sensor array by a factor of nine while still allowing all of the photons striking the original set 94 to contribute to the binned set 96. Other bin ratios and/or combinations of different bin ratios in each direction may be implemented to meet the criteria of a particular application.

Figure 3:
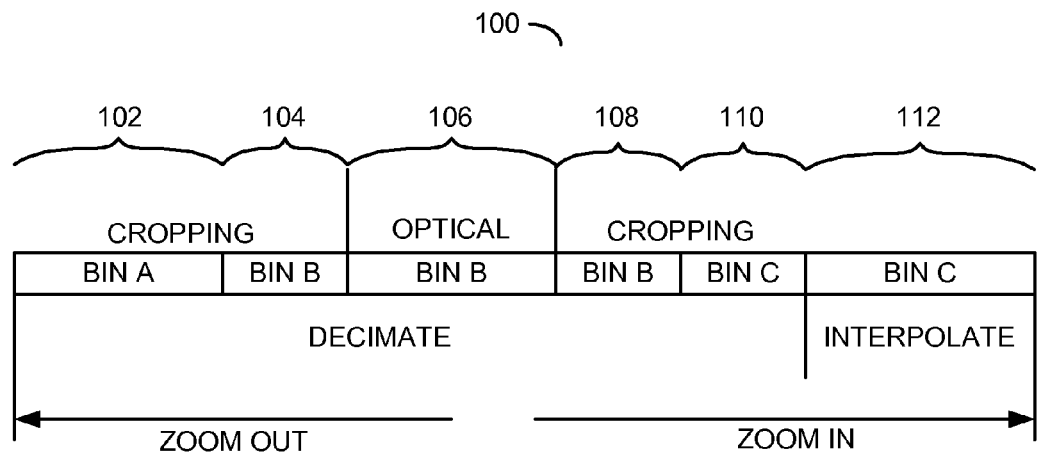
FIG. 3 is a block diagram illustration a zooming operation.

Referring to FIG. 3, a block diagram illustrating a zooming operation 100 is shown. The operation 100 may comprise a section (or range) 102, a section (or range) 104, a section (or range) 106, a section (or range) 108, a section (or range) 110 and a section (or range) 112. Any given horizontal point in the figure may be considered a unique zoom factor. Movement toward the left (e.g., zoom out) in the figure generally produces a wider field of view (e.g., a smaller zoom factor). Movement toward the right (e.g., zoom in) in the figure generally produces a narrower field of view (e.g., a larger zoom factor).

From a given zoom factor, a cropping operation and an optional optical zooming operation may be used to increase and decrease the zoom factor. A full range of zoom factors may be achieved using cropping over a low zoom range (e.g., sections 102 and 104), optical zooming over a medium zoom range (e.g., section 106) and cropping over a high zoom range (e.g., sections 108 and 110). Zooming beyond the high zoom range may be achieved using an interpolation operation (e.g., section 112).

Zooming may be achieved by a user pressing controls to zoom in or zoom out. The pressed control generally causes the camera to utilize a cropping setting and an optical zoom setting corresponding to a position in FIG. 3. If the current amount of zoom corresponds to the zoom level in one of the sections 102, 104, 108, 110 or 112, more or less zoom may be achieved by more or less cropping. For example, if the user commands "zoom in", more cropping may be used. If the user commands "zoom out", less cropping is used. If the current amount of zoom corresponds to a zoom level in the section 106, zooming may be achieved by optical zooming. For example, if the user commands "zoom in" within the section 106, more optical zoom may be used. If the user commands "zoom out" within the section 106, less optical zoom may be used.

When the camera changes sections, the method of zooming may also change. For example, if the amount of zoom corresponds to the section 104 and the user selects to zoom further in, more and more cropping (e.g., less and less sensor area) may be used until the section 106 is reached. Thereafter, the amount of cropping may remain constant and increasing optical zooming may be used until the section 108 is reached. Thereafter, more and more cropping may be used.

Conversely, if the amount of zoom corresponds to the section 108 and the user selects to zoom further out, less and less cropping may be user until the section 106 is reached. Thereafter, the amount of cropping may remain constant and decreasing optical zooming may be used until the section 104 is reached. Thereafter, less and less cropping may be used while the optical zooming remains constant.

Other arrangements of the cropping, optical zooming and interpolation may be implemented to meet the criteria of a particular implementation. In a first example of another arrangement, the sections 102 and 104 may be eliminated such that the optical zooming in section 106 covers a lowest range of zoom factors. In a second example of another arrangement, optical zooming in the section 106 may be eliminated such that the camera only implements electronic zooming by cropping and possibly interpolating. In a third example, the sections 108 and 110 may be eliminated such that interpolating in section 112 adjoins the optical zooming in section 106.

For sensors implementing a binning capability, a bin ratio in one or both directions may be changed one or more times. For example, in the section 102, a first bin ratio (e.g., BIN A) may be utilized. In the sections 104, 106 and 108 a second bin ratio (e.g., BIN B) may be used. In the sections 110 and 112, a third bin ratio (e.g., BIN C) may be used. Generally, BIN A has a higher bin ratio than BIN B. BIN B generally has a higher bin ratio than BIN C. BIN C may have a 1:1 bin ratio in each direction (e.g., binning off or no binning).

The sections 102-110 may use various cropping windows to achieve various zoom factors. Zooming out generally means decreasing a window size (e.g., increasing sensor area). Zooming in generally means increasing the window size (e.g., decreasing sensor area). More cropping generally allows for less binning. The section 112 may also implement cropping to a window size matching the final resolution.

Figure 4:
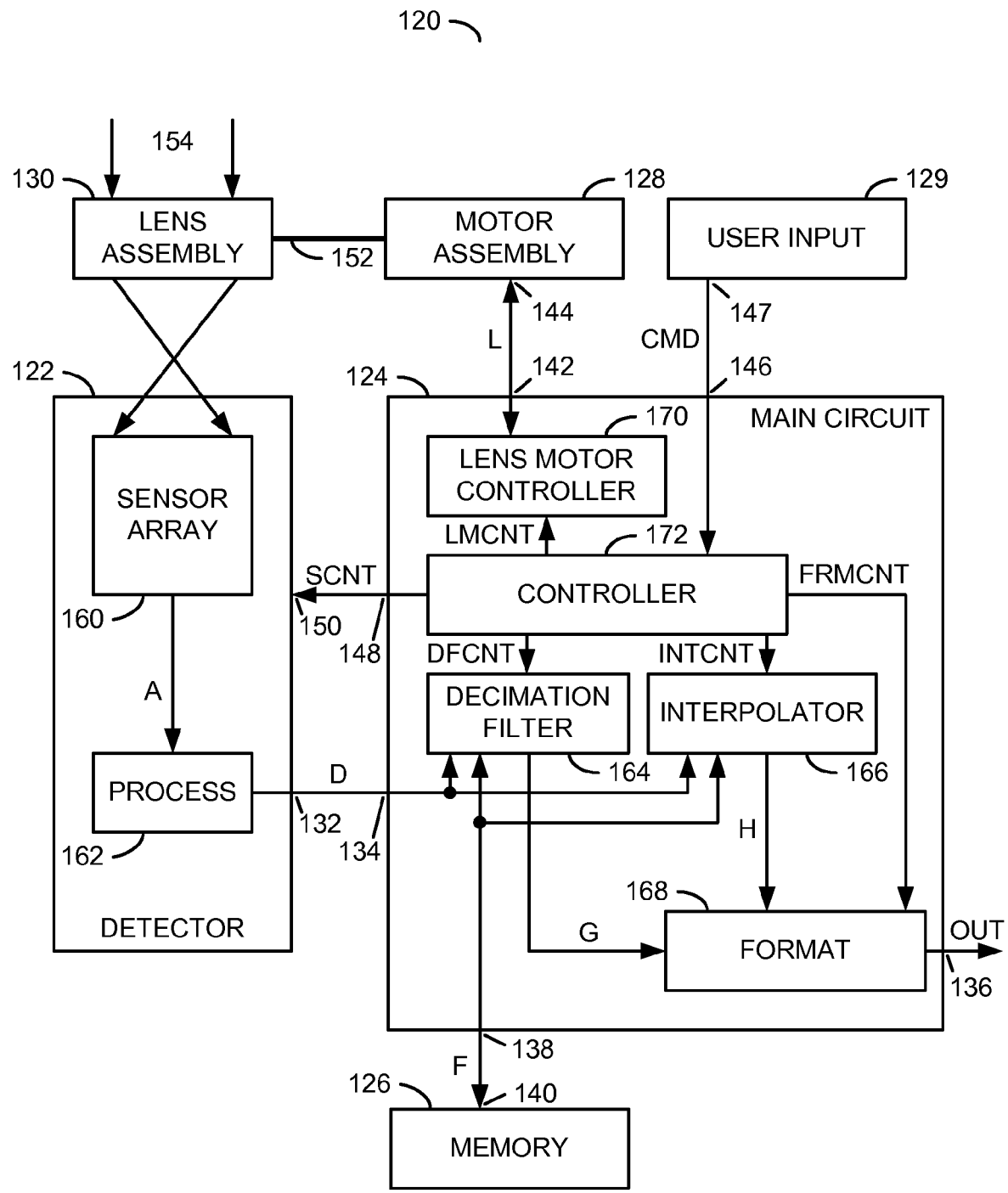
FIG. 4 is a block diagram of an example implementation of a system in accordance with a preferred embodiment of the present invention.

Referring to FIG. 4, a block diagram of an example implementation of a system 120 is shown in accordance with a preferred embodiment of the present invention. The system 120 may be suitable for applications in digital still cameras and camcorders. The system 120 generally comprises a circuit (or module) 122, a circuit (or module) 124, a circuit (or module) 126, a circuit (or module) 128, a circuit (or module) 129 and an assembly (or module) 130.

A signal (e.g., D) may be presented at an output 132 of the circuit 122 to an input 134 of the circuit 124. A signal (e.g., OUT) may be generated at an output 136 of the circuit 124. An interface 138 of the circuit 124 may be connected to an interface 140 of the circuit 128 to transfer a signal (e.g., F). A signal (e.g., L) may be presented from an output 142 of the circuit 124 to an input 144 of the circuit 128. A signal (e.g., CMD) may be received at an input 146 of the circuit 124 from an output 147 of the circuit 129. A signal (e.g., SCNT) may be presented from an output 148 of the circuit 124 to an input 150 of the circuit 122. A mechanical linkage 152 may be disposed between the circuit 128 and the assembly 130. The assembly 130 may focus an optical signal (e.g., light) 154 onto a surface of the circuit 122 to form an optical image.

The circuit 122 may be referred to as a detector circuit. The detector circuit 122 may be operational to convert the optical image received from the assembly 130 into the digital signal D in response to the control signal SCNT. The digital signal D may convey one or more optical images as one or more electronic images. The control signal SCNT may carry windowing, binning, read rate, offset, scaling, color correction and other information for use by the detector circuit 122. The electronic images may be configured to have an initial resolution (e.g., a horizontal number of image elements by a vertical number of image elements) and an initial data rate.

The circuit 124 may be referred to as a main circuit. The main circuit 124 may be configured to generate the signal OUT by processing the one or more electronic images received in the digital signal D as instructed by a user via the command signal CMD. The main circuit 124 may be operational to generate the control signal SCNT and the signal L in response to the command signal CMD. The signal OUT generally comprises a still image (e.g., JPEG) or a video bitstream (e.g., ITU-R BT.656-4) having a sequence of images (or pictures). The picture or pictures carried by the signal OUT may be configured to have a final resolution smaller than the initial resolution of the electronic images in the digital signal D. The command signal CMD may carry zoom factor commands and optional mode commands from the user. In one embodiment, the detector circuit 122 and the main circuit 124 may be fabricated on separate dies. In another embodiment, the detector circuit 122 and the main circuit 124 may be fabricated on the same die.

The circuit 126 may be referred to as a memory circuit. The memory circuit 126 may be operational to temporarily store image data (e.g., luminance and chrominance) for the main circuit 124. In one embodiment, the memory circuit 126 may be fabricated as one or more dies separate from the main circuit 124 fabrication. In another embodiment, the memory circuit 126 may be fabricated on the same die as the main circuit 124.

The circuit 128 may be referred to as a motor assembly. The motor assembly 128 may be operational to actuate the linkage 152 in response to the signal L. The linkage 152 generally comprises a first mechanical element for focus control and an independent second mechanical element for zoom control.

The signal L generally carries command information for the focus operation and command information for the optical zoom operation. The signal L may also carry position and/or velocity feedback data from the motor assembly 128 back to the main circuit 124.

The circuit 129 may be referred to as a user input circuit. The user input circuit 129 may be operational to generate the signal CMD based on commands received from a user. The commands received may include, but are not limited to, a zoom in command, a zoom out command, a normal mode, a low light mode and a low distortion mode. In one embodiment, the signal CMD may comprise multiple discrete signals (e.g., one signal for each switch implemented in the user input circuit 129). In another embodiment, the signal CMD may carry the user entered commands in a multiplexed fashion as one or a few signals.

The assembly 130 may be referred to as a lens assembly. The lens assembly 130 may be operational to optically zoom and optically focus the optical signal 154 onto a surface of the detector circuit 122 to form the optical image. The optical image may vary over time and thus may be considered a sequence of optical images. Focusing may be controlled by the first mechanical element of the linkage 152. Zooming may be controlled by the second mechanical element of the linkage 152.

The detector circuit 122 generally comprises a sensor array 160 and a circuit (or module) 162. The sensor array 160 may be operational to convert the optical image generated by the assembly 130 into a series of values in a signal (e.g., A). The values conveyed in the signal A may be analog voltages representing a luminance value at a predetermined color for each individual sensor element of the sensor array 160. The sensor array 160 may include an electronic cropping (or windowing) capability. The electronic cropping capability may be operational to limit readout of image elements in a window (or an active area) of the sensor array 160. The circuit 162 may be operational to process and convert the analog signal A to generate the digital signal D.

Processing of the electronic images may include, but is not limited to, analog gain for color corrections, analog offset adjustments for black level calibrations, digital gain for color corrections and digital offsets for color corrections. The conversion generally comprises an analog to digital conversion (e.g., 10-bit) and color space conversion (e.g., Bayer to RGB). An example implementation of the detector circuit 122 may be an MT9T001 3-megapixel digital image sensor available from Micron Technology, Inc., Bosie, Id. Operations of the MT9T001 sensor are generally described in a document, "Micron, ½-inch, 3-megapixels CMOS Active-Pixel Digital Image Sensor", Preliminary Datasheet, MT9T001, September 2004, by Micron Technology Inc., hereby incorporated by reference in its entirety.

The main circuit 124 generally comprises a circuit (or module) 164, an optional circuit (or module) 166, a circuit (or module) 168, a circuit (or module) 170 and a circuit (or module) 172. The circuits 164 and 166 may receive the digital signal D from the circuit 162 and exchange the signal F with the memory 126. The circuit 168 may generate the signal OUT. The circuit 170 may generate the signal L. The circuit 172 may receive the command signal CMD and generate the control signal SCNT.

A signal (e.g., G) may be provided by the circuit 164 to the circuit 168. A signal (e.g., H) may be provided by the circuit 166 to the circuit 168. The circuit 172 may provide a control signal (e.g., LMCNT) to the circuit 170. The circuit 172 may also provide a control signal (e.g., DFCNT) to the circuit 164. A control signal (e.g., INTCNT) may be transferred from the circuit 172 to the circuit 166. A control signal (e.g., FRM-CNT) may be presented from the circuit 172 to the circuit 168.

The circuit 164 may be referred to as a decimation filter circuit. The decimation filter circuit 164 may be operational to generate one or more intermediate (decimated) images in the signal G by decimating the one or more electronic images in the digital signal D. An amount of horizontal decimation and/or vertical decimation may be determined by the control signal DFCNT. The intermediate images in the signal G may be configured to have a final resolution smaller than the initial resolution conveyed in the signal D.

The circuit 166 may be referred to as an interpolation circuit. The interpolation circuit 166 may be operational to generate one or more intermediate (interpolated) electronic images in the signal H by interpolating the one or more images in the signal D. The interpolated images may be configured to have the final resolution, similar to the decimated images.

The circuit 168 may be referred to as a format circuit. The format circuit 168 may be operational to generate the video signal OUT by formatting the one or more intermediate images in the signal G or the signal H, one signal at a time. The format circuit 168 may generate the signal OUT in further response to the control signal FRMCNT. The signal FRMCNT may also command the format circuit 168 to select between the signal G and the signal H.

The circuit 170 may be referred to as a lens motor controller circuit. The lens motor controller circuit 170 may be operational to generate the signal L in response to control information received the control signal LMCNT and any feedback data received from the motor assembly 128.

The circuit 172 may be referred to as a controller circuit. The controller circuit 172 may be operational to generate the control signals LMCNT, DFCNT, INTCNT, FRMCNT and SCNT in response to the command signal CMD and limitations of the detector circuit 122. In particular, the controller circuit 172 may be configured to generate the signal DFCNT, SCNT and LMCNT to implement a normal operating mode, a low light mode and a low distortion mode of the HR Zoom process. The control signal INTCNT may control interpolation operations. The control signal FRMCNT may control formatting operations.

Figure 5:
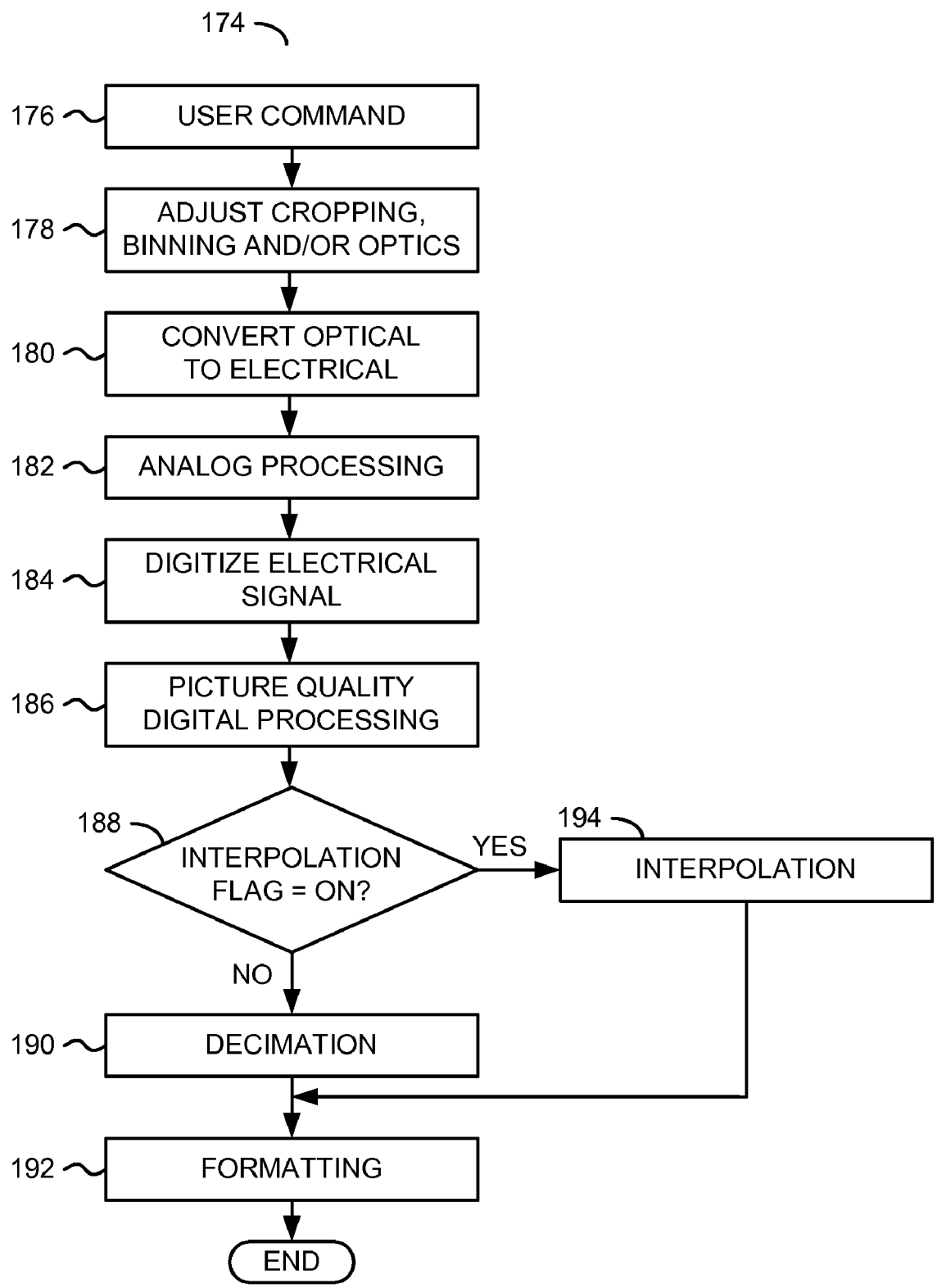
FIG. 5 is a flow diagram of an example method of processing an optical image.

Referring to FIG. 5, a flow diagram of an example method 174 of processing an optical image is shown. The method (or process) 174 generally comprises a step (or block) 176, a step (or block) 178, a step (or block) 180, a step (or block) 182, a step (or block) 184, a step (or block) 186, a step (or block) 188, a step (or block) 190, a step (or block) 192 and a step (or block) 194. The method 174 is generally applied during the normal mode.

A description of the method 174 generally starts with a reception of one or more user commands at the user input circuit 129 (e.g., step 176). The controller circuit 172 may generate (i) the control signal SCNT to adjust cropping and binning in the detector circuit 122 and/or (ii) the control signal LMCNT to adjust an optical zoom of the lens assembly 130 (e.g., step 178) in response to commands received in the command signal CMD. The sensor array 160 may convert the optical image to an electrical image (e.g., step 180). The processing circuit 162 may perform analog processing (e.g., step 182), analog to digital conversion (e.g., step 184) and picture quality digital processing (e.g., step 186) to generate the signal D.

A check may be performed on an interpolation flag (e.g., step 188) to determine if the system 120 should include interpolation (e.g., ON) or not (e.g., OFF). If the interpolation flag is off (e.g., the NO branch), the decimation filter circuit 164 may decimate the electrical images in the signal D (e.g., step 190). The formatter circuit 168 may then format the signal G to generate the signal OUT (e.g., step 192). If the interpolation flag is on (e.g., the YES branch), the interpolation circuit 166 may interpolate the image data in the signal D to generate the interpolated signal H (e.g., step 194). The formatter circuit 168 may then format the signal H to generate the signal OUT (e.g., step 192).

The method 174 may be applied to a sequence of images where the signal OUT is a video bitstream. Particular values for the optical zoom factor, the decimation factor and/or the window size may vary over time such that different final images at different times may have different zoom factors.

Figure 6:
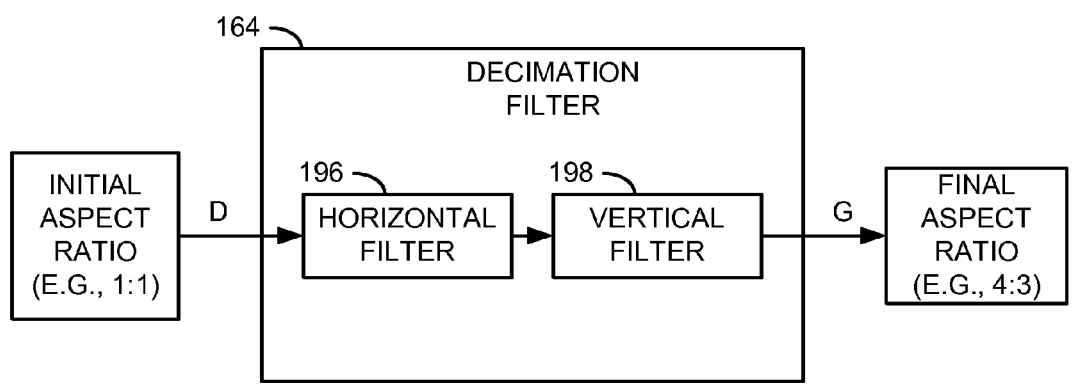
FIG. 6 is a block diagram of an example implementation of a decimation filter circuit.

Referring to FIG. 6, a block diagram of an example implementation of the decimation filter circuit 164 is shown. The decimation filter circuit 164 may be configured to perform a horizontal decimation independently of a vertical decimation. The decimation filter circuit 164 may comprise a horizontal decimation filter circuit (or module) 196 and a vertical decimation filter circuit (or module) 198. The horizontal decimation filter circuit 196 may be operational to decimate image rows to a first decimation factor. The vertical decimation filter circuit 198 may be operational to decimate image columns to a second decimation factor different from the first decimation factor.

Implementing different horizontal and vertical decimation levels may allow the system 120 to change an aspect ratio between the electronic images in the signal D and the decimated images in the signal G. For example, the sensor array 160 may be a square array generating an initial aspect ratio of 1:1. The images in the signal OUT, and thus the signal G, may be designed to have a final (e.g., standard definition) aspect ratio of 4:3. Therefore, the horizontal decimation filter circuit 196 and the vertical decimation filter circuit 198 may be programmed via the control signal DFCNT to different decimation factors. As such, the 1:1 aspect ratio images in the signal D may be converted into 4:3 aspect ratio images in the signal G. Where the first decimation factor matches the second decimation factor, a combined decimation factor may be used to control both the horizontal decimation filter circuit 196 and the vertical decimation filter circuit 198.

Figure 7:
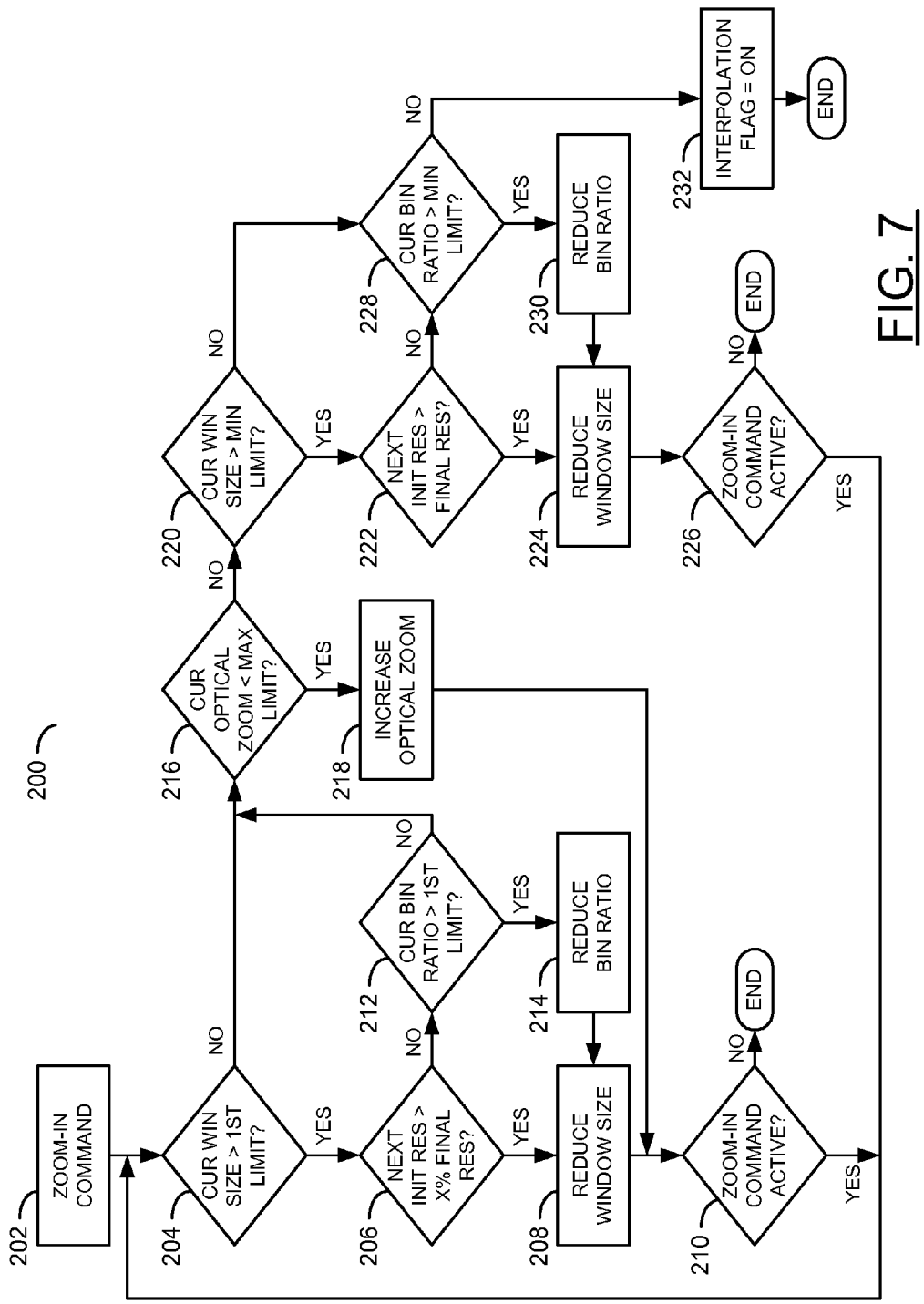
FIG. 7 is a flow diagram of an example zoom-in process.

Referring to FIG. 7, a flow diagram of an example zoom-in process 200 is shown. The zoom-in process (or method) 200 generally comprises a step (or block) 202, a step (or block) 204, a step (or block) 206, a step (or block) 208, a step (or block) 210, a step (or block) 212, a step (or block) 214, a step (or block) 216, a step (or block) 218, a step (or block) 220, a step (or block) 222, a step (or block) 224, a step (or block) 226, a step (or block) 228, a step (or block) 230 and a step (or block) 232. A limited number of steps of the zoom-in process 200 are generally illustrated by block diagrams shown in FIGS. 8A-8E. A zoom-out process may be implemented as a reverse of the zoom-in process 200.

Figure 8:
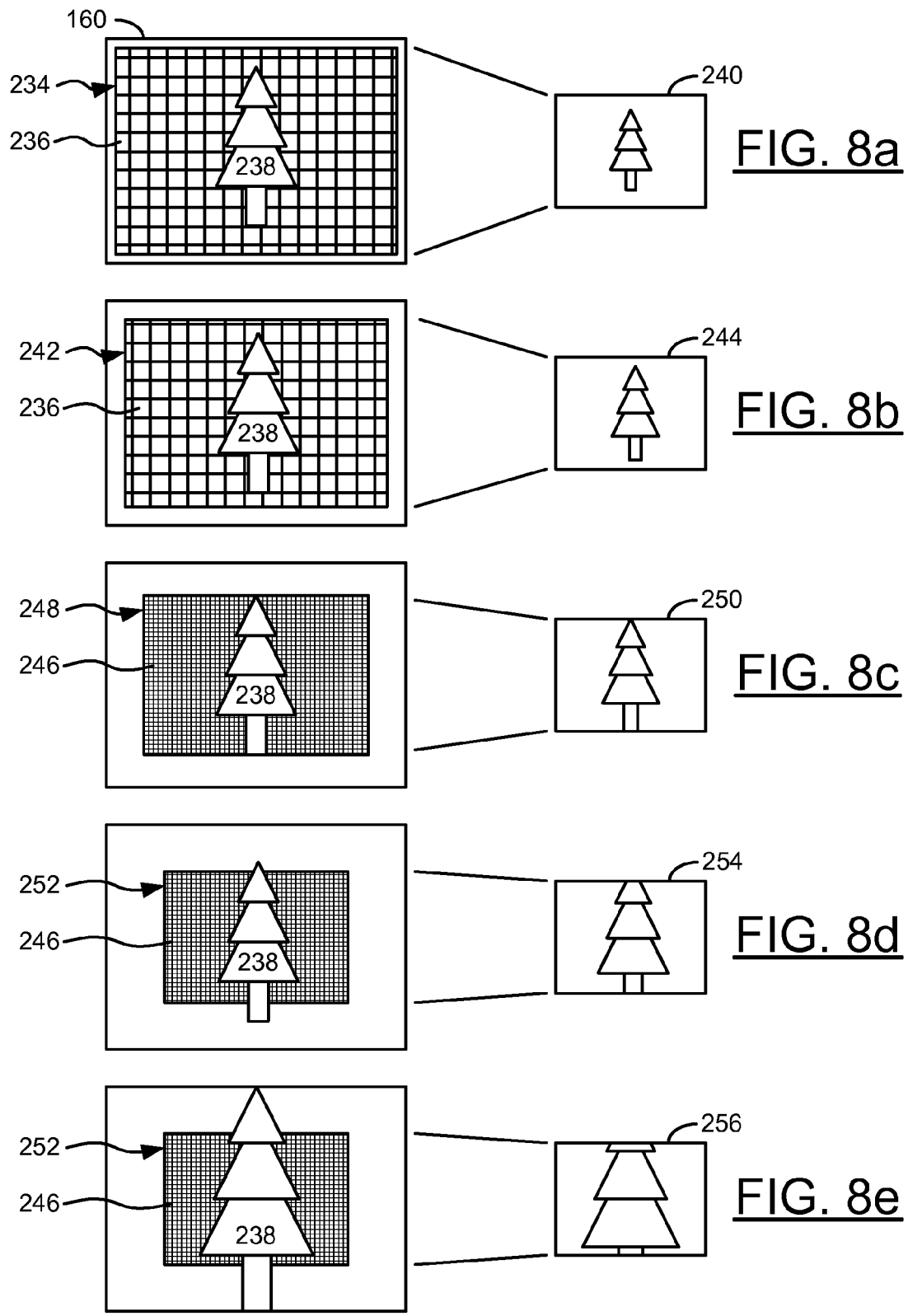
FIGS. 8A-8E are block diagrams illustrating various window size and bin ratio settings.

A description of the zoom-in process 200 may begin with receipt of a zoom-in command from the user (e.g., step 202). Referring to FIG. 8, the sensor array 160 may be configured with a particular window size 234 and a particular bin ratio 236 that completely bounds a particular item (e.g., a tree) 238 being photographed when the zoom-in command is received. At the particular settings, the tree 238 may reside completely inside a picture 240 in the signal OUT. A check may be made of a current window size (e.g., cropping) against a first size limit (e.g., step 204). If the current window size is greater than the first limit (e.g., the YES branch), a resolution of an electronic image generated in a smaller window size is compared with the final resolution of the video signal OUT (e.g., step 206). If the next initial resolution is at least a predetermined percentage (e.g., X≧10%) greater than the final resolution (e.g., the YES branch), the controller circuit 172 may command the detector array 122 to reduce the window size by a unit step (e.g., step 208). Referring to FIGS. 8A and 8B, the current window size 234 may be reduced to a next smaller window size 242 with the same current bin ratio 236. The next smaller window size 242 may still completely capture the tree 238. Decimating the smaller window size 242 to the final resolution may cause the tree 236 to appear slightly larger in a picture 244 than in the picture 240. After reducing the window size, the main circuit 124 may check if the zoom-in command is still active (e.g., step 210). If the zoom-in command is still active (e.g., the YES branch), the process 200 may return to step 204 to consider a next smaller window size. Otherwise (e.g., the NO branch), the zoom-in process 200 may end.

As the window size decreases, the initial resolution of the images in the signal D may come too close to the final resolution for proper decimation operations (e.g., the NO branch of step 206). When the initial resolution becomes too small, a check may be made to see if the current bin ratio could be reduced (e.g., step 212). If the current bin ratio is greater than a first predetermined limit (e.g., 2:1) (e.g., the YES branch), the controller circuit 172 may command a next lower bin ratio to the detector circuit 122 (e.g., step 214). The controller circuit 172 may also command a next smaller window size (e.g., step 208). Referring to FIGS. 8B and 8C, the reduction in the current bin ratio 236 and the current window size 242 may result in a new bin ratio 246 and a new window size 248. As such, the tree 238 may appear larger in a picture 250 than in the picture 244.

The zoom-in operation 200 may continue looping around steps 204-214 reducing the window size and reducing the bin ratio causing the tree 238 to appear larger and larger in the video signal OUT. Referring to FIGS. 8C and 8D, another smaller window size 252 at the bin ratio 246 may cause the tree 238 to appear larger in a picture 254 than in the picture 250.

At some point during the zoom-in operation, either the current window size may reach the first predetermined window limit (e.g., the NO branch of step 204) or the bin ratio may reach the first predetermined ratio limit (e.g., the NO branch of step 212). Afterwards, the zoom-in process 200 may continue zooming with an optical zoom operation. First, the main circuit 124 may compare a current optical zoom factor against a maximum limit (e.g., step 216). If the lens assembly 130 is not at the maximum limit (e.g., the YES branch), the main circuit 124 may command the motor assembly 128 to increase the optical zoom factor by a unit step (e.g., step 218). Referring to FIGS. 8D and 8E, the optical zoom operation may result in an increased coverage of the tree 238 over the window size 252 at the bin ratio 246. As such, the tree 238 may appear even larger in a picture 256 than in the picture 254. The check for an active zoom-in command may be repeated (e.g., step 210) after each optical zoom step.

If the lens assembly 130 is at the maximum optical zoom limit (e.g., the NO branch of step 216), the zoom-in process 200 may optionally continue HR Zoom through additional further cropping and decimation. In particular, the current window size may be compared against a minimum window size (e.g., step 220). If the current window size may be reduced, (e.g., the YES branch), the main circuit 124 may check if the initial resolution at both (i) the next smaller window size and (ii) the current bin ratio remains greater than the final resolution (e.g., step 222). If the initial resolution is greater than the final resolution (e.g., the YES branch), the main circuit 124 may command the detector circuit 122 to the next smaller window size (e.g., step 224). The signal CMD may be examined for an active zoom-in command (e.g., step 226) and zooming either continued (e.g., the YES branch) by rechecking the newly reduced window size against the first predetermined window limit, if commanded, otherwise the zoom-in process 200 may be ended (e.g., the NO branch). If the window size reaches a minimum limit (e.g., the NO branch of step 220), the main circuit 124 may determine if the current bin ratio may be further reduced (e.g., step 228). If the bin ratio may be reduced (e.g., the YES branch), the main circuit 124 may command the detector circuit 122 to reduce the bin ratio used in the sensor array 160 (e.g., step 230). Otherwise (e.g., the NO branch of step 228), an HR Zoom portion of the zoom-in process 200 may be completed. Therefore, the interpolation flag may be set on (e.g., step 232) to allow zooming to continue using interpolation, if implemented.

The present invention may include various combination of the HR Zoom and the optical zoom to provide a higher degree of magnification. A continuous zoom may be implemented (i) starting with a maximum optical field of view (e.g., a wide angle), (ii) implementing electronic zoom first to a predetermined zoom factor, window size and/or bin ratio, (iii) transitioning to the optical zoom until a maximum telephoto limit is reached and (iv) finally resuming the electronic zoom until cropping to the center-most area of the sensor array 160 with a minimal initial resolution (as illustrated in FIG. 8). In one embodiment, a continuous zoom may be implemented (i) starting with a maximum wide angle, (ii) implementing an optical zoom until the maximum optical telephoto limit is reached and (iii) then transitioning to the HR Zoom until cropping to the center-most area of the sensor with the target minimum initial resolution. In another embodiment, (i) the electronic zoom may be utilized until a maximum electronic zoom is reached and then (ii) an optical zoom may be performed. Each case may be followed by interpolated zoom where an area smaller than the minimum initial resolution of the signal D may be up-sampled to increase the zoom factor. Other combinations of the electronic zoom, the optical zoom and the interpolation may be implemented to meet the design criteria of a particular application. A zoom-out operation may reverse the zoom-in operation.

The decimation operation may produce poor quality video if the final resolution in the signal G is not much smaller (e.g., <10% smaller) than the initial resolution in the signal D at a maximum read rate from the sensor array 160. Instead of performing up-sampling (interpolation) in the post-binned signal A to obtain a proper resolution in the signal D, different modes of operation (or settings) may be used in the detector circuit 122 corresponding to the effective area used in the sensor array 160. In particular, if more sensor array area is used, then more binning (e.g., a higher bin ratio) may be implemented to keep the raw data rate at an acceptable level. As such, the system 120 may implement a few fixed zoom factors, or a small range of continuous zoom factors instead of a large continuous range of zoom factors.

An example of fixed zoom factors may be illustrated with a 5 million pixel sensor array 160 having a maximum read rate of 61 million samples per second. A first zoom setting generally allows a capture of slightly more (e.g., 10% more) than a 720-line progressive scan frame (e.g., 1280×720 pixels), at 60 frames per second, with 2:1 binning both horizontally and vertically and using almost all of a 16×9 area of the sensor array 160. A second zoom setting may use slightly more (e.g., 10% more) than the center-most 1280×720 area of the sensor array 160 and a 1:1 bin ratio resulting in a two times greater zoom factor than the first setting. In both instances, (i) the final resolution is generally not degraded by the signal processing and (ii) only binning and photon noise may contribute to the degradation of the picture quality. The first setting may optimize for photon noise (e.g., low light) and the second setting may optimize for binning distortion.

The window size, bin ratio and decimation parameters may be adjusted to maximize particular performances of the system 120 in various modes. A specific zoom factor may be a product of (i) the zoom from cropping the sensor area utilized and (ii) the optical zoom. In many scenarios, a particular zoom factor may be obtained by (a) using a little cropping (e.g., large window sizes) and a large optical zoom or (b) using a large cropping (e.g., small window sizes) and less optical zoom. For example, photonic noise may be an important consideration in low light conditions and therefore a "maximum sensor" coverage mode may be implemented for option (a). In bright lighting conditions, a low binning distortion may be an important consideration and therefore a non-binning mode may be implemented for option (b). In low light, option (a) may be preferred because using more of the sensor area generally reduces the noise of the (resized) picture. In good light, option (b) may be preferred because binning generally adds distortion thus little or no binning may result in a higher final picture quality.

Figure 9:
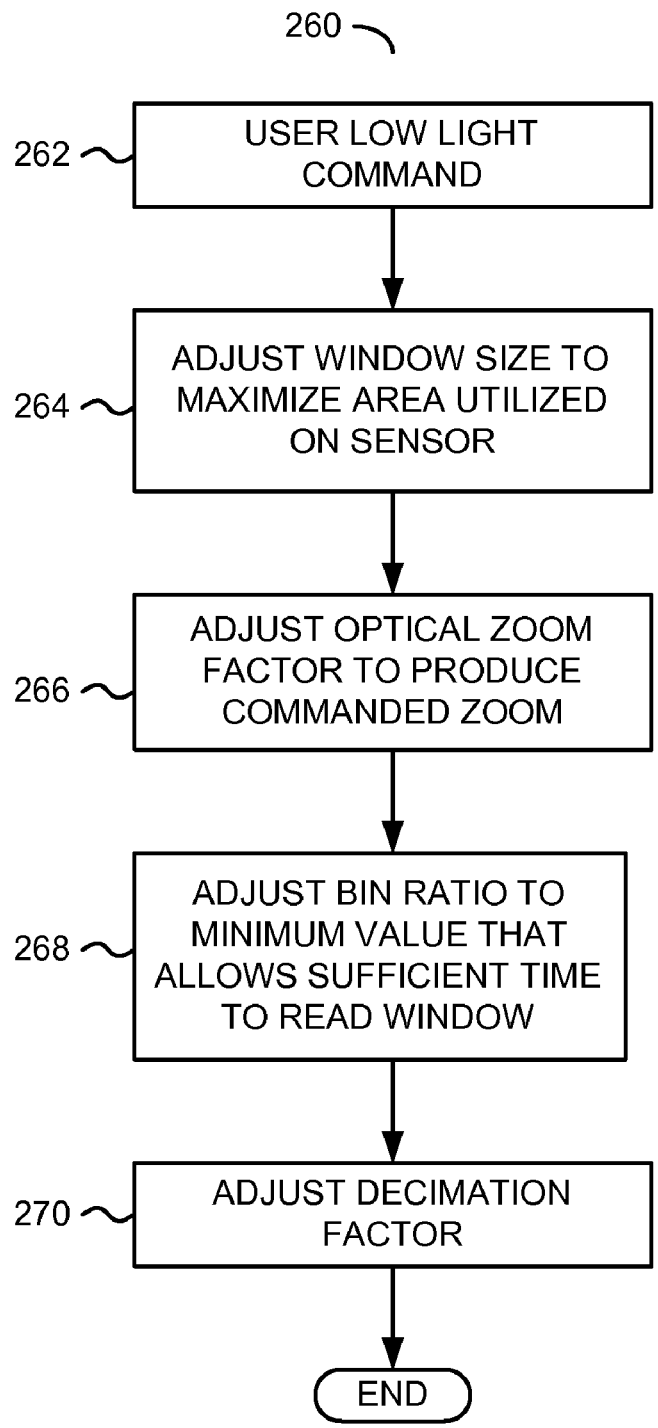
FIG. 9 is a flow diagram of an example method for configuring a low light mode.

Referring to FIG. 9, a flow diagram of an example method 260 for configuring a low light mode is shown. The method 260 may be referred to as a low light method. The low light method 260 generally comprises a step (or block) 262, a step (or block) 264, a step (or block) 266, a step (or block) 268 and a step (or block) 270.

A description of the low light method 260 may begin with a reception of a low light mode command (e.g., step 262). The main circuit 124 may calculate and apply a particular window size that may maximize a utilized area of the optical image falling on the sensor array 160 and may achieve the user commanded zoom factor (e.g., step 264). The main circuit 124 may then calculate and apply a particular optical zoom factor to obtain the user commanded zoom factor (e.g., step 266). The main circuit 124 may calculate and apply a minimum bin ratio in each direction that provides sufficient time to read the image elements from within the applied window size of the sensor array 160 (e.g., step 268). The calculated bin ratio may have a lower limit of 1:1. The main circuit 124 may then calculate and adjust the decimation factor accordingly to produce the user commanded zoom factor (e.g., step 270).

Figure 10:
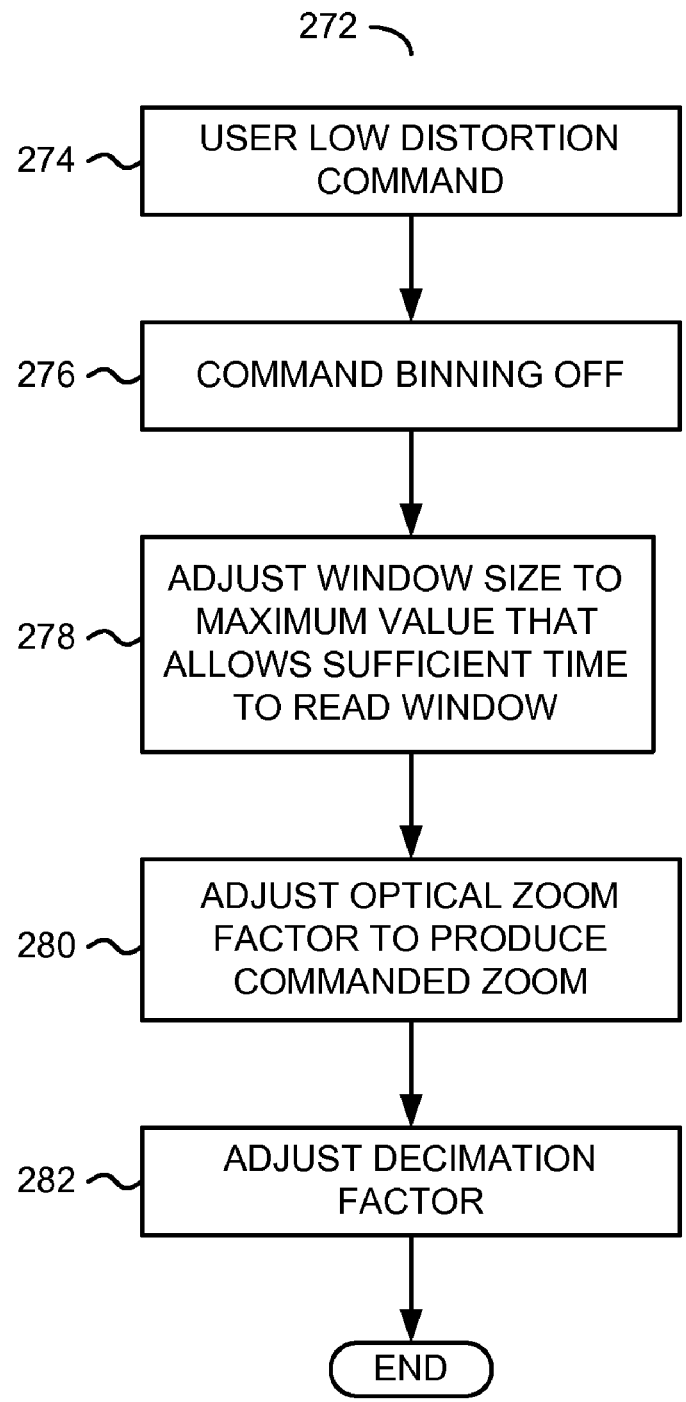
FIG. 10 is a flow diagram of an example method for configuring a low distortion mode.

Referring to FIG. 10, a flow diagram of an example method 272 for configuring low distortion mode is shown. The method 272 may be referred to as a low distortion method. The low distortion method 272 generally comprises a step (or block) 274, a step (or block) 276, a step (or block) 278, a step (or block) 280 and a step (or block) 282.

A description of the low distortion method 272 may begin with a reception of a low distortion mode command (e.g., step 274). The main circuit 124 may command the detection circuit 122 to switch off a binning operation (e.g., step 276). No binning generally minimizes an amount of distortion introduced in the electronic image by the binning operation in the sensor array 160. The main circuit 124 may then calculate and apply a particular window size that provides sufficient time to read the image elements from the sensor array 160 with binning off (e.g., step 278). The main circuit 124 may calculate and apply a particular optical zoom factor to obtain the user commanded zoom factor in the final image (e.g., step 280). The main circuit 124 may then calculate and adjust the decimation factor accordingly to produce the final resolution in the final image (e.g., step 282).

Each of the low light mode and the low distortion mode generally uses a fixed (e.g., not changing) bin ratio and alters both of a window size and an optical zoom factor to obtain a range of zoom factors. The zoom factor ranges of the two modes may overlap. Whether a mode is low noise or low distortion generally depends on the bin ratio utilized. For example, consider a frame rate of 60 Hz, a maximum pixel readout rate of 120 megapixels/second (e.g., 2 million pixels per frame), a final resolution of 1280×720, a minimum of 1 million pixels in the electronic images, a 16:9 aspect ratio and a 3× maximum optical zoom lens assembly 130. For the low noise mode, binning may be commanded at 2:1 each way. A usable sensor array area may range from 2666×1500 to 3772×2122 pixels (e.g., 4 to 8 megapixels before zooming and 1 to 2 megapixels afterwards). Therefore, the electronic cropping and decimation may cover a 1 to 1.414 zoom factor for the system. Accounting for the lens assembly 130, the zoom factor for the system may be 1 to 4.24.

For the low distortion mode, binning may be commanded off. The usable sensor array area may range from 1333×750 to 1886×1061 pixels (e.g., 1 to 2 megapixels). Since a quarter of the sensor array area may be used, compared to the low noise mode, the zoom factor for the system may cover 2 to 8.49 in the low distortion mode.

In general, mode selection may be used to control the amount of optical versus cropping used for zooming. Low noise sensing or low distortion processing may be reasons why more or less cropping (and corresponding less or more optical zooming) would be used. Another reason for mode selection may be a total zoom range. For example, in the last example "low noise" may also be thought of as "wide angle" and "low distortion" may be thought of as "narrow angle". A user who expects to shoot mainly wide shots may choose the low noise mode. A user expecting to shoot mainly narrow shots may choose the low distortion mode.

The mode selection may be made by a user through pressing a button, using a menu, or similar means. Various methods may be used to describe the mode differences such as words or icons printed below the button, words or icons shown on a display (such as an LCD) and the like. The various methods may convey the meaning of modes in different ways. For example, the meaning (in words, icons or other means) may be presented as:

Low light/normal
Low light/low distortion
Normal/low distortion
Wide angle/normal
Wide angle/high zoom
Normal/high zoom A camera implementing the present invention may include any of a variety of user mode controls, menus, buttons and/or icons that control the amount of cropping for a given zoom factor, no matter how the user mode controls may be presented.

The present invention generally allows a user to control a zoom amount by cropping a sensor area that will be digitized and down-sampling to a final resolution. The amount of cropping and down-sampling may be controlled so that a final resolution is substantially constant over a range of different cropping (zoom) factors. Binning may be implemented in the HR Zoom process to decrease a data rate. During the process of zooming, binning may be reduced or completely switched off as a smaller area of the sensor array is cropped such that data captured with little to no binning may have a higher quality. The HR Zoom process may be combined with optical zoom to augment the zoom factor. Combinations generally include both optical zoom first and electronic zoom first. User controllable modes may be implemented to provide discrete zoom settings. A fixed setting mode generally covers cases where the range of continuous HR Zoom may be unavailable. In each discrete zoom setting, a bin ratio and a fixed decimation factor may be combined with an optical zoom.

The functions performed by the flow diagrams of FIGS. 5, 7, 9 and 10 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for zooming a camera, comprising the steps of:
(A) receiving an electronic image at a circuit from an electro-optical sensor, wherein said electronic image has an initial resolution;
(B) generating a final image in an output signal by decimating said electronic image per a decimation factor, wherein (i) said final image has a final resolution and (ii) said final resolution is smaller than said initial resolution; and
(C) changing a zoom factor of said final image continuously over a range by both (i) adjusting said decimation factor and (ii) generating a first signal that commands said electro-optical sensor to adjust a window size within said electro-optical sensor,
wherein said first signal further commands said electro-optical sensor to switch off a binning within said electro-optical sensor in response to said zoom factor reaching a particular level.

2. The method according to claim 1, wherein step (C) comprises the sub-step of:
maintaining said final resolution of said final image substantially constant throughout said changing of said zoom factor.

3. The method according to claim 1, further comprising the step of:
generating a second signal that commands a motor assembly to adjust a lens in front of said electro-optical sensor.

4. The method according to claim 1, further comprising the step of:

receiving a second signal, wherein (i) said second signal conveys a current one of a plurality of modes and (ii) said current mode is selected by a user.

5. The method according to claim 4, wherein said first signal further commands said electro-optical sensor to adjust a bin ratio within said electro-optical sensor to a particular ratio in response to a low light mode of said modes, wherein said low light mode minimizes an amount of photon noise in said final image.

6. The method according to claim 4, wherein said first signal further commands said electro-optical sensor to adjust said window size to a particular size in response to a low distortion mode of said modes, wherein said low distortion mode minimizes an amount of distortion in said final image.

7. The method according to claim 1, further comprising the step of:
generating said final image by interpolating said electronic image to said final resolution instead of decimating said electronic image while said window size is smaller than said final resolution.

8. The method according to claim 1, wherein said first signal further commands said electro-optical sensor to maximize a readout rate of said electronic image by adjusting at least one of (i) said window size and (ii) an amount of binning within said electro-optical sensor.

9. The method according to claim 1, wherein said output signal comprises a video signal.

10. An apparatus comprising:
a circuit configured to (i) receive an electronic image from an electro-optical sensor, wherein said electronic image has an initial resolution, (ii) generate a final image in an output signal by decimating said electronic image per a decimation factor, wherein (a) said final image has a final resolution and (b) said final resolution is smaller than said initial resolution, and (iii) change a zoom factor of said final image continuously over a range by both (a) adjusting said decimation factor and (b) generating a first signal that commands said electro-optical sensor to adjust a window size within said electro-optical sensor,
wherein said first signal further commands said electro-optical sensor to switch off a binning within said electro-optical sensor in response to said zoom factor reaching a particular level.

11. The apparatus according to claim 10, wherein said circuit is further configured to maintain said final resolution of said final image substantially constant throughout said change of said zoom factor.

12. The apparatus according to claim 10, wherein said circuit is further configured to generate a second signal that commands a motor assembly to adjust a lens in front of said electro-optical sensor.

13. The apparatus according to claim 10, wherein (i) said circuit is further configured to receive a second signal, (ii) said second signal conveys a current one of a plurality of modes and (iii) said current mode is selected by a user.

14. The apparatus according to claim 13, wherein said first signal further commands said electro-optical sensor to adjust a bin ratio within said electro-optical sensor to a particular ratio in response to a low light mode of said modes, wherein said low light mode minimizes an amount of photon noise in said final image.

15. The apparatus according to claim 13, wherein said first signal further commands said electro-optical sensor to adjust said window size to a particular size in response to a low distortion mode of said modes, wherein said low distortion mode minimizes an amount of distortion in said final image.

16. The apparatus according to claim 10, wherein said circuit is further configured to generate said final image by interpolating said electronic image to said final resolution instead of decimating said electronic image while said window size is smaller than said final resolution.

17. The apparatus according to claim 10, wherein said first signal further commands said electro-optical sensor to maximize a readout rate of said electronic image by adjusting at least one of (i) said window size and (ii) an amount of binning within said electro-optical sensor.

18. An apparatus comprising:
  means for receiving an electronic image from an electro-optical sensor, wherein said electronic image has an initial resolution;
  means for decimating said electronic image per a decimation factor to generate a final image, wherein (i) said final image has a final resolution and (ii) said final resolution is smaller than said initial resolution; and
  means for changing a zoom factor of said final image continuously over a range by both (i) adjusting said decimation factor and (ii) generating a first signal that commands said electro-optical sensor to adjust a window size within said electro-optical sensor,
  wherein said first signal further commands said electro-optical sensor to switch off a binning within said electro-optical sensor in response to said zoom factor reaching a particular level.

* * * * *